April 4, 1933.    R. S. FALKINER    1,903,335
CANE HARVESTING MACHINERY
Filed Feb. 28, 1929
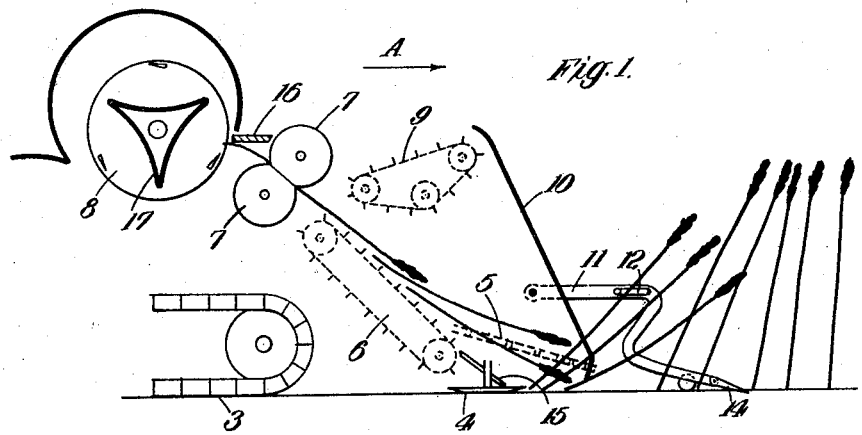
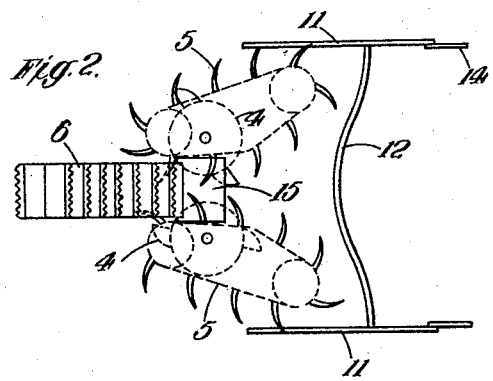
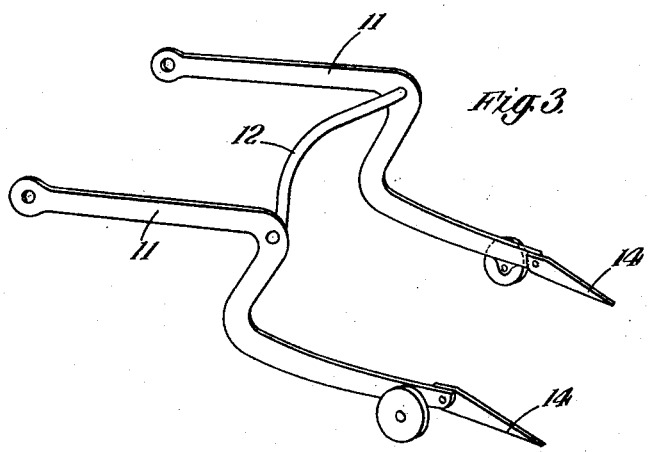
INVENTOR
RALPH S. FALKINER
BY E. C. Sanborn
ATTORNEY Patented Apr. 4, 1933

1,903,335

UNITED STATES PATENT OFFICE

RALPH SADLEIR FALKINER, OF MELBOURNE, AUSTRALIA, ASSIGNOR TO FALKINER CANE HARVESTER CORPORATION OF AMERICA, OF NEW YORK, N. Y.

CANE HARVESTING MACHINERY

Application filed February 28, 1929, Serial No. 343,516, and in Great Britain May 14, 1928.

This invention relates to improvements in cane harvesting machinery more particularly designed for dealing with crops wherein the cane is bent, tangled or in repose.

Can harvesting machines are already known wherein the cane is cut and topped and the trash, leaves and the like are separated from the good cane.

My invention is particularly concerned with the provision of efficient and reliable means whereby the cane may be positively gathered, severed, and fed butts first into the machine. In the embodiment herein disclosed a pusher or the like in advance of the ground knives is adapted to handle the cut cane butts first, and a guide plate is arranged above and behind the cutting edges of the ground knives while the gathering means are arranged in advance of the ground knives and the plate so that the cane is positively gathered just before the butts are severed, and when severed the butts are positively guided up the plate on to the usual conveyor. Another feature consists in arranging a portion of the gathering means in advance of the ground knives so that the cane is positively engaged by the gatherers before the cutting takes place with the result that the cane is at all times under positive control.

The gatherers feed the cane, butts first, on to a conveyor which carries the cane to a pair of pneumatic or resiliently tyred rolls for example, which feed the cane to cutting and topping mechanism.

This cutting and topping mechanism may be of any suitable kind but preferably it consists of a fixed blade or plate under which the butts of the cane are fed and a rotating knife or knives co-operating with the fixed blade or plate and adapted to cut the cane, tops and trash into pieces with an upward movement, so that the pieces are ejected upwardly. This cutting arrangement is similar in action to that of a lawn mower. A deflector device may be arranged behind the rotating knives to assist in the ejection of the cut pieces and the pieces of cane may be directed by means of baffles or deflector plates into the desired position for collection and removal.

Air blast means may also be provided for separating the lighter cut pieces of tops, leaves, trash and the like.

It will be understood, however, that the present invention is concerned with the gathering of the severed cane, butts first, and so presenting it to the various mechanisms of the machine. The machine may be fitted with any suitable mechanisms for dealing with the severed cane and trash.

To enable the invention to be fully understood it will now be described by reference to the accompanying drawing in which:—

Fig. 1 is a diagrammatic representation of a portion of a cane harvesting machine having one form of the invention applied thereto.

Fig. 2 is a plan view of the front portion thereof, and

Fig. 3 is a detail of the machine drawn to a larger scale.

As shown in the diagrammatic drawing, the machine illustrated is of the general type described in the specifications of the aforesaid patents. The track is indicated at 3, the rotating knives for severing the cane at or near the ground at 4, the gathering mechanism at 5, the elevator or conveyor for carrying the severed cane at 6, the rollers for feeding the cane at 7 and the cutting mechanism at 8. A moving endless band fitted with prongs or the like is shown at 9 to assist the passage of the severed cane to the rollers 7. These features are known in themselves and form no part of this invention, except in combination with the method of handling the severed cane, butts first. The front of the machine is indicated at 10, the direction of travel being shown by the arrow A. To the front of the machine is fixed a pusher or fender (Fig. 3) which may comprise two side bars 11 and a top bar 12 shaped as shown. The fender is pivotally or hingedly attached to the machine frame at the points 13 so that it floats with the ends of the bars 11 on the ground, the fender being sufficiently wide to embrace a row of canes or slightly wider. The ends of the bars 11 are preferably formed as stump jumping fingers 14 of known construction, that is to say each finger is hinged and spring pressed so that while normally riding in an extended position, if an obstruction is met with, the finger bends backwardly raising the fender to clear the obstruction as will be readily understood. If desired the side bars may be fitted with rollers or shoes adapted to run on the ground. The fender projects in front of the machine and meets the cane in advance of the machine and pushes it forwardly and bends or inclines it away from the machine as indicated. The side bars act to gather in cane which may extend across the path of travel of the machine. The ground knives 4, sever the cane at the butts and a sloping guide plate 15 is arranged above and immediately behind the cutting point of the knives and serves to guide the severed butts of the cane up on to the elevator 6.

The gatherers 5, comprising the usual endless bands fitted with prongs are arranged as clearly shown in Fig. 2 and assist the severed butts to ride up the plate 15 on to the elevator. The cane is carried up the elevator to the rollers 7 and is fed under the fixed knife 16 to the rotary cutter 8. The rotary cutter is fitted with a deflecting plate 17. The fender may be of any other suitable construction and may be adjustable according to the height of the canes to be operated upon.

Having thus described the nature of the said invention and the best means I know of carrying the same into practical effect, I claim:—

1. In a cane harvesting machine, means for severing cane from the ground, mechanism for cutting the cane into pieces, conveying means to the rear of said severing means and adapted to feed the cane, with the stalks lengthwise of the machine, to the cutting mechanism, and means comprising gathering means in advance of severing means and a guiding member above and behind said severing means, said third-named means being constructed and arranged for causing the severed cane to be fed butts first to said conveying means.

2. In a cane harvesting machine, means for severing cane adjacent the ground, means to urge the cane to fall forwardly, conveying means to the rear of said severing means, and means comprising a guiding member above and behind said severing means to engage the bottoms of the cane stalks, said third-named means being constructed and arranged for causing the severed cane to be fed butts first to said conveying means.

3. In a cane harvesting machine, means for severing cane from the ground, conveying means to the rear of said severing means, gathering means in advance of said severing means, a fender extending forwardly of said gathering means, and means floatably mounting said fender to enable the latter to accommodate itself to ground irregularities during its travel with the machine.

4. In a cane harvesting machine, means for severing cane from the ground, means positioned above said severing means and rearwardly thereof for cutting the severed cane and attendant trash into small pieces, positively operated means inclined upwardly and rearwardly of said severing means for conveying the severed cane to the cutting means, fender means extending forwardly of the severing means for pushing the upper portions of the cane stalks away from said severing means, and gathering means in advance of the severing means for causing the severed cane to be fed butts first to the conveying means.

5. In a cane harvesting machine, means for severing cane from the ground, means for cutting the severed cane and attendant trash into small pieces, endless conveyor means for elevating the severed cane to the cutting means, and means in advance of the severing means and rotatable in a plane at an angle to that of the severing means for causing the severed cane to be fed butts first to the conveying means.

6. In a cane harvesting machine, means for severing cane from the ground, means positioned rearwardly of said severing means for cutting the severed cane and attendant trash into small pieces, fender means extending forwardly of the severing means for pushing the upper portions of the cane stalks away from said severing means, and means angularly disposed with respect to the severing means and separate therefrom for causing the severed cane to be fed to the cutting means with the stalks lengthwise of the machine, said several means being generally aligned lengthwise of the machine.

7. In a cane harvesting machine, means for severing cane from the ground, means for cutting the severed cane and attendant trash into small pieces, fender means extending forwardly of the severing means for pushing the upper portions of the cane stalks away from said severing means, gathering means in advance of the severing means, and means comprising an element inclined upwardly and rearwardly from said severing means for receiving the cane butts first from said gathering means and conveying the cane upwardly and rearwardly.

8. In a cane harvesting machine, means for severing cane from the ground, means positioned rearwardly of said severing means for cutting the severed cane and attendant trash into small pieces, fender means extending forwardly of the severing means for pushing the upper portions of the cane stalks away from said severing means, and means separate from the severing means for causing the severed cane to be fed to the cutting means with the stalks lengthwise of the machine, said several means being generally aligned lengthwise of the machine.

In testimony whereof I have signed my name to this specification.

RALPH SADLEIR FALKINER.